United States Patent [19]
Fukuyama

[11] Patent Number: 5,107,974
[45] Date of Patent: Apr. 28, 1992

[54] REVOLVING FORCE TRANSMISSION/REVOLUTION STOPPING DEVICE

[75] Inventor: Hiroshi Fukuyama, Tokyo, Japan
[73] Assignee: Bridgestone Corporation, Japan
[21] Appl. No.: 675,385
[22] Filed: Mar. 26, 1991
[30] Foreign Application Priority Data
  Mar. 28, 1990 [JP] Japan .................................. 2-80478
[51] Int. Cl.⁵ ............................................. F16D 25/04
[52] U.S. Cl. .............................. 192/88 B; 192/85 AT; 188/366
[58] Field of Search .............. 192/85 AT, 88 R, 88 B, 192/72; 188/365, 366, 367

[56] References Cited
U.S. PATENT DOCUMENTS
2,710,087  6/1955  Picard ................................ 192/88 B
2,940,572  6/1960  Warman, Jr. ...................... 192/88 B
4,453,625  6/1984  Franks ............................... 192/88 B

*Primary Examiner*—Richard Lorence
*Attorney, Agent, or Firm*—Jordan and Hamburg

[57] ABSTRACT

A revolving force transmission/revolution stopping device which supports rotatably one of two shafts or both and connects/disconnects a revolving force of one of the two shafts to/from the other or stops one of the shafts from revolving. At least a portion of one of the two shafts is in the form of a hollow cylinder while the other shaft is at least partially inserted in the hollow cylindrical portion, either of the two shafts is provided with a member inflatable when supplied with a fluid, a passage for supply and discharge of the fluid is formed in the shaft having the inflatable member, and the inflatable member, when inflated by the supplied fluid, catches the shaft with no such inflatable member or is forced to the hollow inner circumferential surface of the cylindrical portion.

4 Claims, 3 Drawing Sheets

REVOLVING FORCE TRANSMISSION/REVOLUTION STOPPING DEVICE

BACKGROUND OF THE INVENTION

1. Field of the Invention

The present invention relates to a revolving force transmission/revolution stopping device which supports rotatably one of two shafts or both and connects/disconnects a revolving force of one of the two shafts to/from the other or stops one of the shafts from revolving.

2. Description of the Prior Art

Various clutches have so far been proposed for connection/disconnection of a revolving force. For example, a clutch is well-known in which disks made of a metal are provided in the proximity of a drive and driven shafts, respectively, and put into contact with each other by means of a mechanism when transmitting a revolving force.

In such clutch, the rigid disks will cause a shock the moment they are coupled with each other. Further, the mechanism for axially moving the revolving disks is rather complicated, and the metallic disks are abraded due to the contact between them, resulting in metallic powder.

SUMMARY OF THE INVENTION

Accordingly, the present invention has an object to overcome the above-mentioned drawbacks such as shock at the moment of the coupling between the disks and a resulting metallic powder in the conventional clutches, by providing a revolving force transmission/revolution stopping device in which two shafts can be softly coupled with comma or uncoupled from, each other or one of the shafts can be softly stopped from revolving.

The above object can be attained by providing a revolving force transmission/revolution stopping device in which at least a portion of one of the two shafts is in the form of a hollow cylinder while the other shaft is at least partially inserted in the hollow cylindrical portion, either of the two shafts is provided with a member inflatable when supplied with fluid, a passage for supply and discharge of the fluid is formed in the shaft having the inflatable member, so that the inflatable member, when inflated by the supplied fliud grips the shaft not having an inflatable member or is forced to the inner circumferential surface of the hollow cylindrical portion.

Since either of the two shafts is provided, according to the present invention at an end thereof with the member inflatable when supplied with a fluid such as air or the like and therein with a passage for supply and discharge of the fluid, the inflatable member can be inflated when supplied with the fluid through the passage, thereby softly coupling the two shafts without any shock at the time of the coupling. Thus, since the two shafts can be softly coupled with each other because of the inflation of the inflatable member, the device according to the present invention can be very effectively used in case a shock-free transmission is required. Also the device according to the present invention can stop one of the two shafts from revolving, due to the inflation for the inflatable member.

DETAILED DESCRIPTION OF THE PREFERRED EMBODIMENTS

The embodiments of the present invention will be described in further detail with reference to the drawings.

Figure 1:
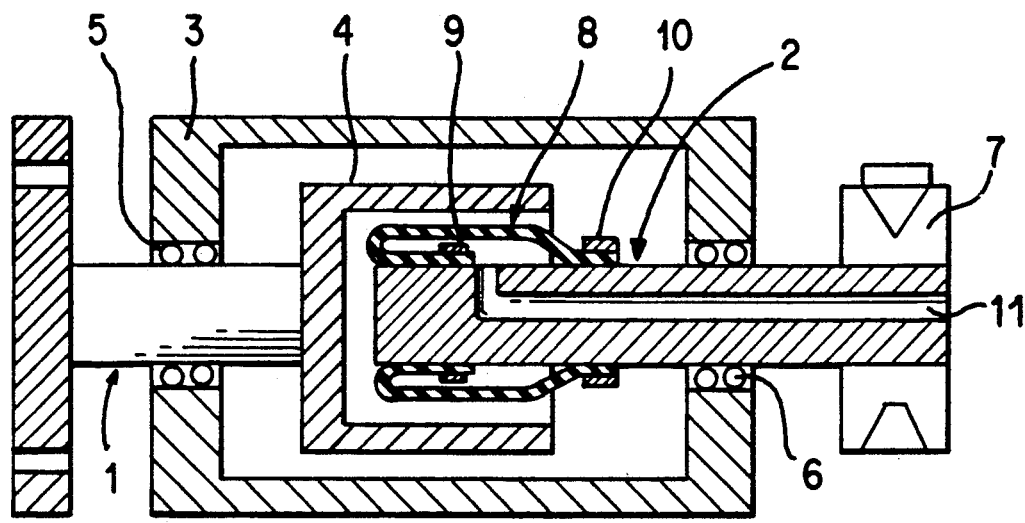
FIG. 1 is a sectional view of a first embodiment of the present invention.
Figure 2:
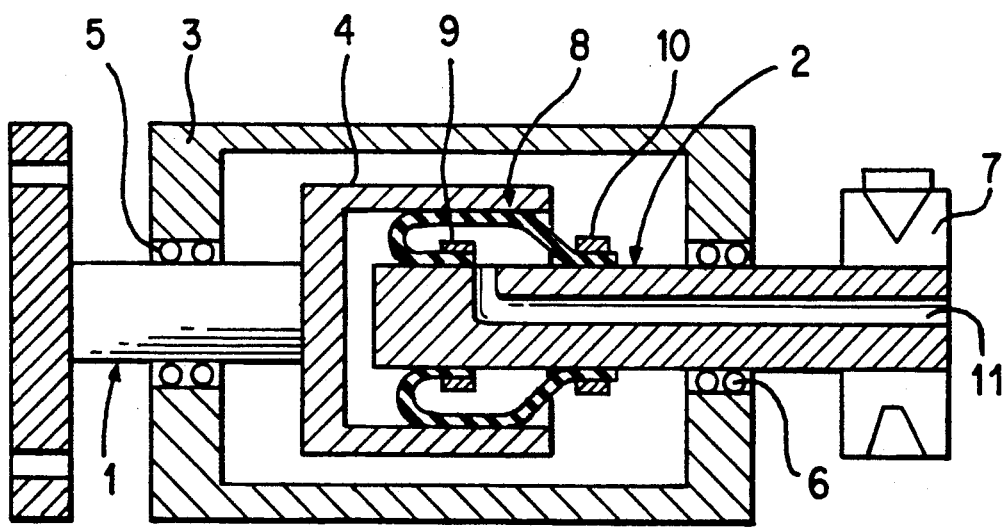
FIG. 2 is a sectional view of the embodiment of FIG. 1, showing the configuration of the device when the inflatable member is inflated.

In the first embodiment shown in FIG. 1, both of rigid shafts 1 and 2 are supported rotatably in a frame 3. One of the shafts (1) has formed at the end thereof a hollow cylinder 4 open at the free end thereof, and the other shaft 2 has the free end thereof inserted in the hollow cylinder 4, these shafts being aligned at the ends thereof with each other. The shaft 1 is supported in a bearing 5 while the shaft 2 is supported in a bearing 6. The shaft 2 extends out of the frame 3 and has fixed on the other end thereof a gear 7 which receives a revolving force from a drive source. The shaft 2 serves as drive shaft while the shaft 1 serves as driven shaft to receive the revolving force from the shaft 2. The shaft 2 has provided on the end thereof inserted in the hollow cylinder 4 a member 8 inflatable when supplied with a fluid. This inflatable member 8 is a tubular one open at opposite ends thereof, one end of which is secured by means of a ring 9 to the shaft 1 at a position near the inner end thereof and folded back and the other end is secured by means of a ring 10 to the shaft 1 approximately the middle thereof. A passage 11 is formed in the shaft 2 to supply/discharge the fluid such as air or the like to/from the inflatable member 8. For transmission of a revolving force of the shaft 2 to the shaft 1 in the device of such structure according to the present invention, a fluid such as air is supplied into the inflatable member 8 through the passage 11, so that the inflatable member 8 is forced to the hollow inner circumferential surface of the cylinder 4 as shown in FIG. 2. When the inflatable member 8 is thus forced to the inner circumferential surface of the hollow cylinder 4, the revolving force of the shaft 2 is softly transmitted to the shaft 1 without any shock.

In the first embodiment, shown in FIGS. 1 and 2, the shaft 1 revolving slowly can be stopped by inflating the member 8 while the shaft 2 is kept stationary with no revolving force imparted thereto.

Figure 3:
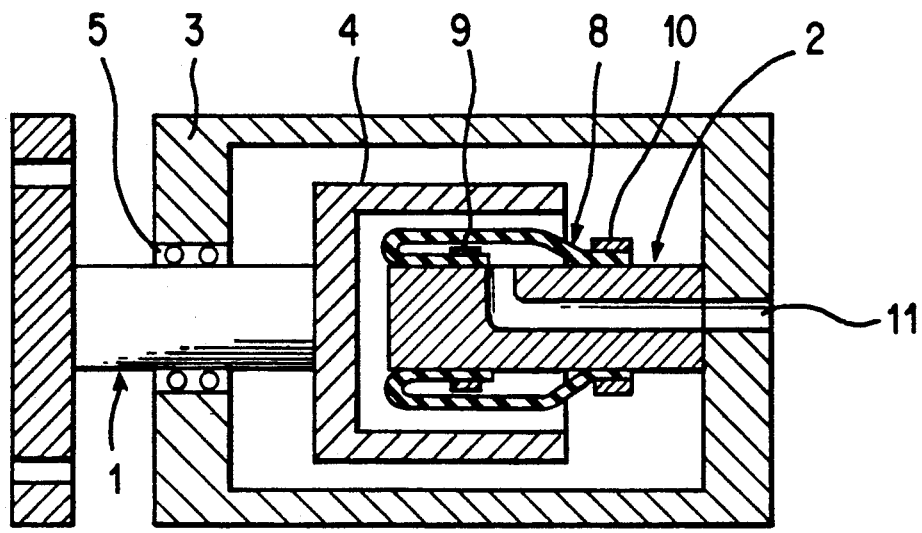
FIG. 3 is a sectional view of a second embodiment of the present invention.

In the second embodiment, shown in FIG. 3, the shaft 2 is fixed to the frame 3 and the inflatable member 8 is installed on the shaft 2, in order only to stop the shaft from revolving. The shaft 1 may be immobilized while the shaft 2 may be rotatable and the inflatable member 8 may be installed on either the shaft 1 or 2.

Figure 4:
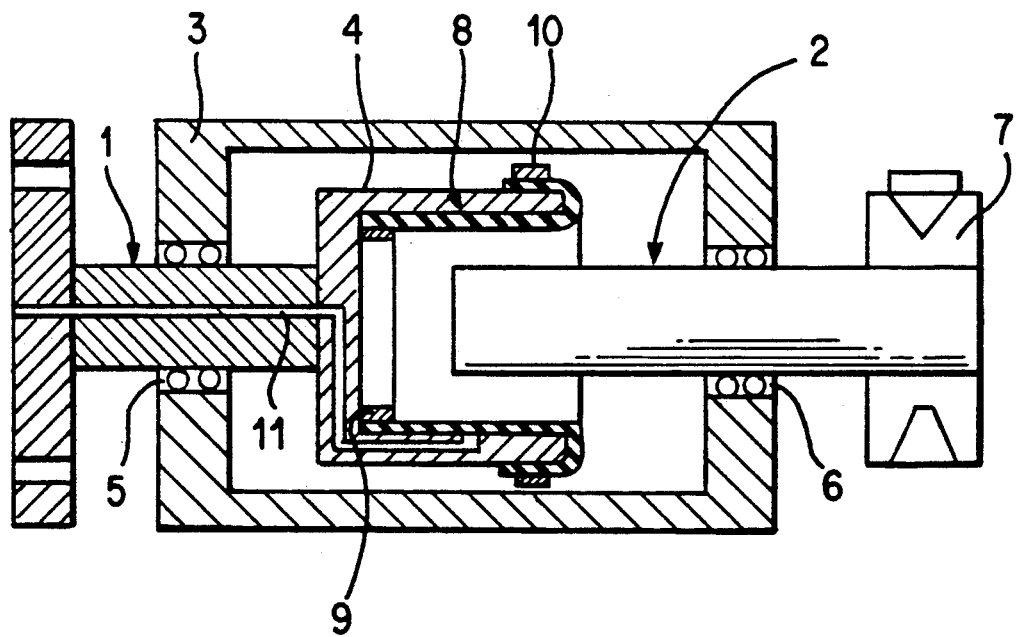
FIG. 4 is a sectional view of a third embodiment of the present invention.

In the third embodiment, shown in FIG. 4, the inflatable member 8 is provided on the hollow cylinder 4 of the shaft 1. The inflatable member 8 is a tubular one open at opposite ends thereof, which is secured at one end thereof by means of a ring 9 to the inner circumferential surface at a position near the bottom of the hollow cylinder 4, folded back outwardly from the open end of the hollow cylinder 4 and secured at the other end thereof by means of a ring 10 to the outer surface of the hollow cylinder 4. A passage 11 is formed in the shaft 1 in this embodiment. When supplied with a fluid such as air or the like through the passage 11, the inflatable member 8 is inflated inwardly and grips the shaft 2 at the end thereof. This arrangement in which the inflatable member 8 is provided on the hollow cylinder 4 of the shaft 1 may be adopted also in the above-mentioned embodiments.

Figure 5:
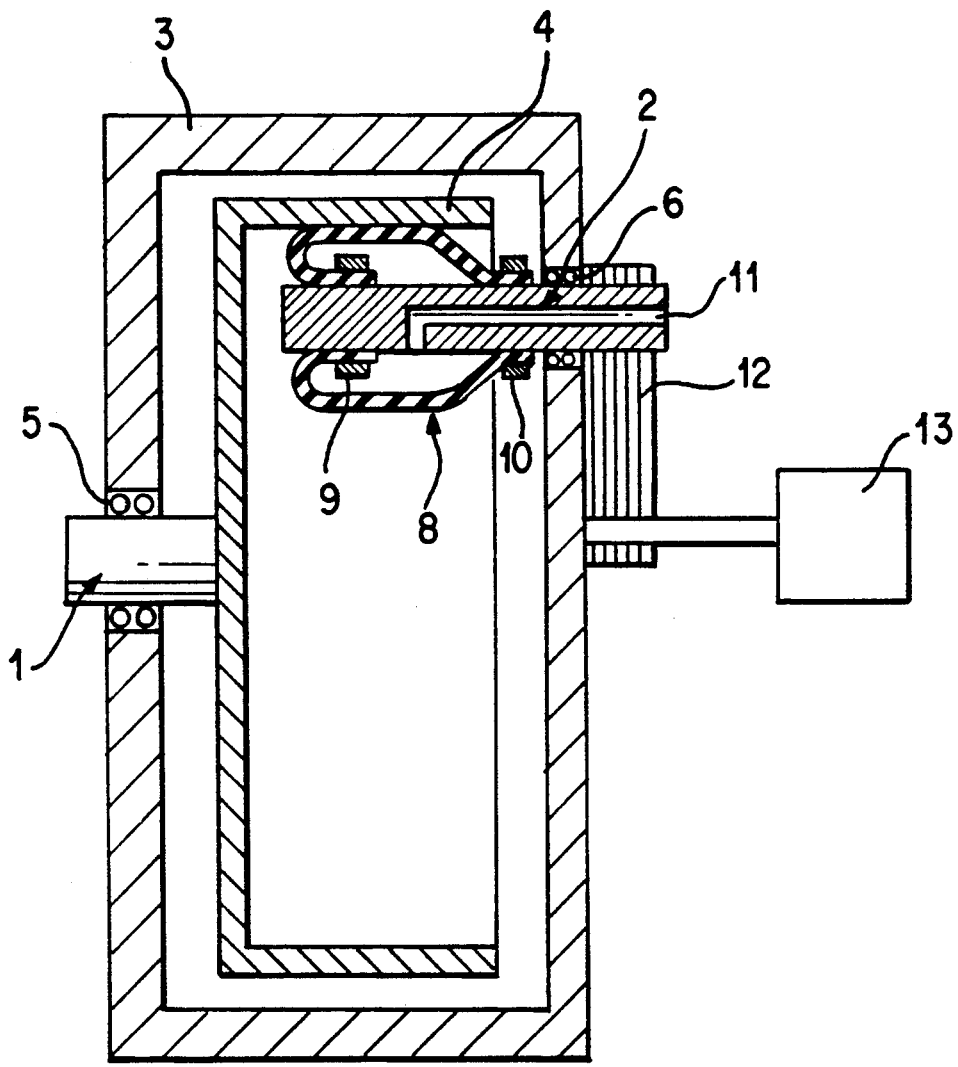
FIG. 5 is a sectional view of a fourth embodiment of the present invention.

In the fourth embodiment, shown in FIG. 5, the inflatable member 8 provided on the shaft 2 is so arranged as to be forced, when inflated, to a portion of the hollow cylindrical end portion 4 of the shaft 1. This structure may serve as speed changer or transmission. The revolving force from a drive source 13 can be transmitted by means of a transmission belt 12 to the outer end of the shaft 2.

In case the inflatable member 8 is made of a rubber tube in the above-mentioned embodiments, it can be improved in strength by burying reinforcing cords therein.

In the above-mentiond embodiments, the shafts 1 and 2 are illustrated as being axially spaced from each other. However, one of the shafts, for example, the shaft 1, as a whole, may be in the form of a hollow cylinder, this hollow cylindrical shaft 1 be installed rotatably on the outer circumference of the other shaft 2, and the inflatable member 8 can be installed on either the shaft 1 or 2.

What is claimed is:

1. A device for transmitting torque from a first shaft to a second shaft in which:
   at least a portion of one of the two shafts is in the form of a hollow cylinder and the other shaft is at least partially inserted into the hollow cylindrical portion;
   either of the two shafts being provided with a member inflatable when supplied with a fluid;
   a passage for supply and discharge of the fluid being formed in the shaft having the inflatable member;
   said inflatable member being made of a tube open at opposite ends thereof,
   the one end of the tube being folded back inwardly or outwardly toward the outer end of the tube to form a folded portion; and
   the ends of said tube being secured to one of the two shafts solely by means of rings; and
   the inflatable member, when inflated by the supplied fluid, grips the shaft not having an inflatable member or is forced on the inner circumferential surface of the cylindical portion.

2. A device as set forth in claim 1, in which the inflatable member is so provided on the shaft inserted in the cylindrical portion that the surface of the inflated member, when inflated, is forced to the inner circumferentail surface of the cylindrical portion.

3. A device as set forth in claim 1, in which the inflatable member is so provided on the cylindrical portion that the surface of the inflatable member, when inflated, is forced to the circumference of the shaft inserted in the cylindical portion.

4. A device as set forth in claim 1, in which reinforcing cords are buried in the inflatable member.

* * * * *